Patented July 28, 1953

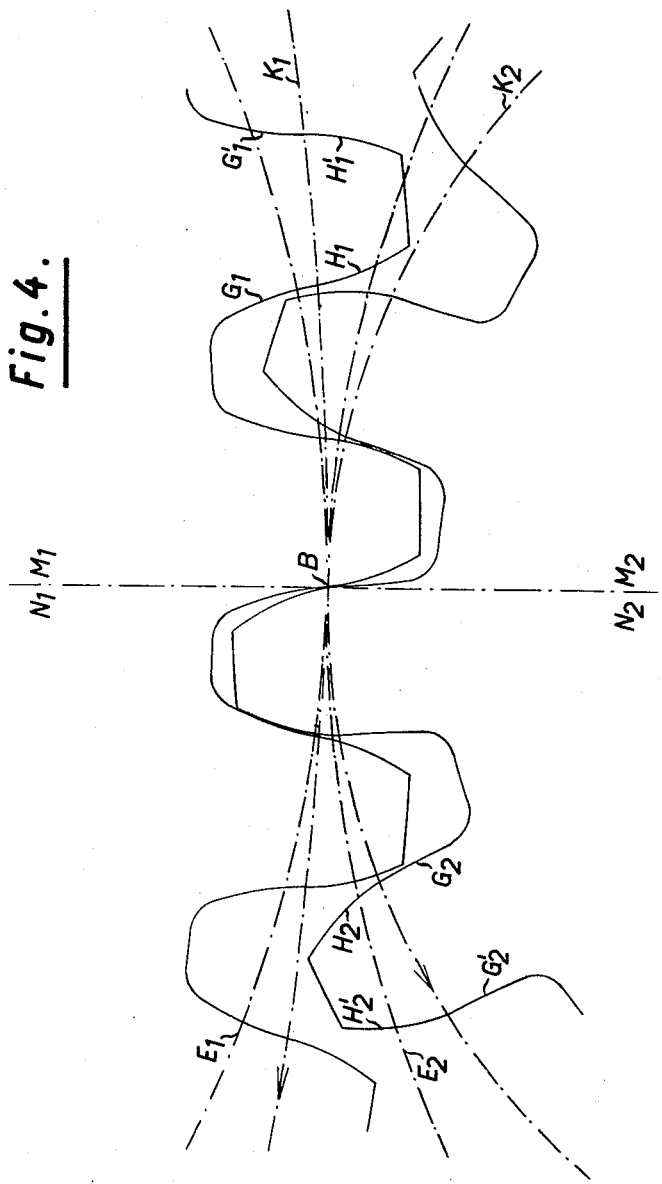

2,646,692

UNITED STATES PATENT OFFICE 2,646,692

GEAR TEETH FOR TOOTHED GEARS

Ulrich Günther, Zurich, Switzerland

Application September 2, 1952, Serial No. 307,493
In Switzerland May 27, 1952

4 Claims. (Cl. 74—462)

The present invention relates to gear teeth for toothed gears of all kinds, for example spur wheels, helical gears, bevel gears, worms, worm wheels, internally toothed wheels, and toothed racks.

Objects of the invention are to provide gear teeth for a toothed gear having two pitch circles which are in contact with one another, and having two generator circles the centres of which are lying on the line connecting the centres of said pitch circles, the generator circles lying eccentrically to one another and being likewise in contact at the point of contact of the pitch circles, said generator circles rotating in the same direction and at the same peripheral speed at said point of contact as the pitch circles, each of said generator circles having a generator curve which extends inwardly from the periphery of the generator circle with a curve differing from the radial, said generator curves rotating together with the peripheries of their generator circles so that the two peripheral points of the generating curves meet on their rotation at said common point of contact of all four circles; said generator curves on their movement with the generator circles generating envelope curves in relation to said pitch circles which envelope curves are corresponding faces and flanks of the gear teeth, said faces and flanks appertaining to one another in pairs, while each generator curve generates those faces and flanks which are located on their side, viewed from the common point of contact of all four circles. A further object is to provide, in gear teeth of the type stated, two generator curves being identical in their curve path including the position of their peripheral points on the generator circles and enclosing at said peripheral points equal angles with the radii of the generator circles drawn from said peripheral points, the two angles counted in the same direction, starting from said radii, and two generator circles of equal size.

These and other objects and the advantages of the invention will best be understood from the following description of a specific embodiment when read in connection with the accompanying drawing, wherein like reference characters indicate like parts throughout the figures and in which:

Figure 4 shows complete teeth of the wheel and pinion having face and flanks in accordance with Figure 3, and shown on the same scale as Figures 2 and 3.

Figure 1:
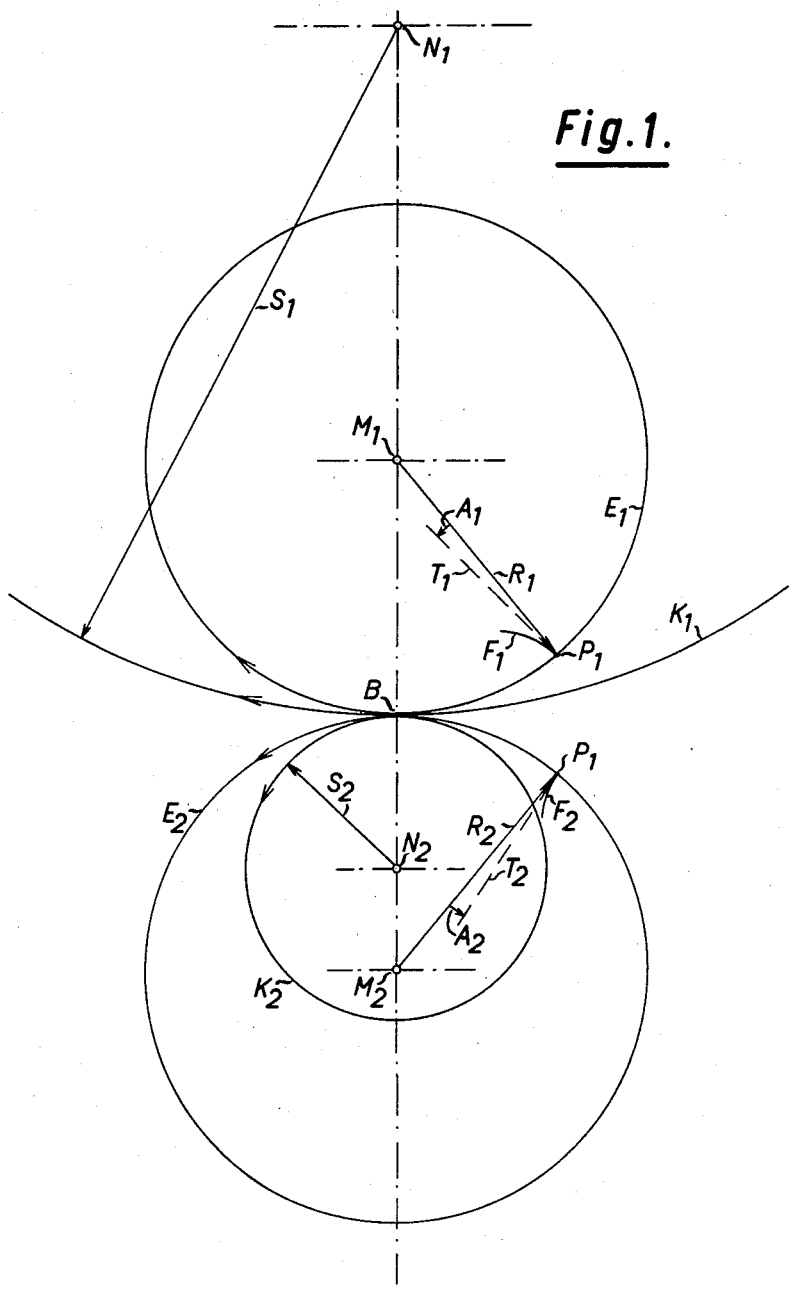
Figure 1 shows the pitch circles of a wheel and pinion and also the generator circles with the generator curves.

In the drawings the wheel has the pitch circle $K_1$ and the pinion the pitch circle $K_2$. The radius $S_1$ of the pitch circle $K_1$ has the ratio of 9:2 to the radius $S_2$ of the pitch circle $K_2$ (Figure 1). The two pitch circles $K_1$ and $K_2$ are in contact at the point B and the centres $N_1$ and $N_2$ of the two pitch circles accordingly lie on the straight line joining the centres and passing through point B, shown as a chain-dotted line.

On this line connecting the centres $N_1$ and $N_2$ also lie the centre $M_1$ of the first generator circle $E_1$ with the radius $R_1$ and the centre $M_2$ of a second generator circle $E_2$ with the radius $R_2$ (Figure 1). The centres $M_1$ and $M_2$ are so positioned on the chain-dotted connecting line between $N_1$ and $N_2$ that the peripheries $E_1$ and $E_2$ are in contact at point B and the generator circles are eccentric to one another. The point B is thus the common point of contact between the two pitch circles $K_1$, $K_2$ and the two generator circles $E_1$, $E_2$. The two generator circles $E_1$ and $E_2$ must be so situated that they do not enclose one another, or in other words the common point of contact B must be situated between the centres $M_1$ and $M_2$. The radii $R_1$ and $R_2$ of the two generator circles $E_1$ and $E_2$ are selected, with respect to the radii $S_1$ and $S_2$ of the two pitch circles $K_1$ and $K_2$, in accordance with the kind of tooth-form desired; the radii $R_1$ and $R_2$ may be smaller or larger than or equal to one of the radii $S_1$ or $S_2$.

On the periphery of the generator circle $E_1$ an origin $P_1$ is now assumed, from which a generator curve $F_1$ extends inwardly of the generator circle $E_1$ (Figure 1). This generator curve $F_1$ may be any desired smooth curve, which is selected in accordance with the desired tooth-form of the wheel and pinion. However, only those curves are permissible for the generator curve $F_1$ which are not identical with the radius $R_1$ of the generator circle $E_1$ passing through the origin $P_1$. The generator curve $F_1$ can thus be any curve different from the radius $R_1$. The origin $P_1$ of the generator curve $F_1$ is at the same time the so-called peripheral point of the generator curve $F_1$, at which the latter begins in the generator circle $E_1$. The tangent $T_1$ to the generator curve $F_1$ at the origin or peripheral point $P_1$ forms an angle $A_1$ with the radius $R_1$ at the point $P_1$. The angle formed by the generator curve $F_1$ at the point $P_1$ in relation to the periphery of the generator circle $E_1$ thus amounts to (90—$A_1$) degrees of arc. The angle $A_1$ is here to be counted in the counter-clockwise direction, starting from the radius $R_1$ passing through the point $P_1$, as indicated by the arrow shown. In corresponding manner a second generator curve $F_2$ is provided, which extends from its origin or peripheral point $P_2$ on the generator circle $E_2$ inwardly of the latter, likewise with a curve which is not identical with the radius $R_2$. The tangent $T_2$ to the generator curve at the point $P_2$ forms an angle $A_2$ with the radius $R_2$ which angle, starting from $R_2$, is likewise counted in the counter-clockwise direction. The two generator curves $F_1$ and $F_2$ may be either different from or identical with one another. They are identical when they, including their origins, can be made to coincide with one another merely by turning and displacing in the plane of the drawing. The angles $A_1$ and $A_2$ may be chosen to be either of the same or different magnitudes; in practice they can have any value from 0 to about 40 degrees of arc.

In order now to understand the generation of the tooth profiles of the wheel and pinion, it is first assumed that the two pitch circles $K_1$ and $K_2$ turn about their centres $N_1$ and $N_2$ in such manner that they run in the same direction and at the same peripheral speed at the point of contact B. In addition, it is assumed, that the two generator circles $E_1$ and $E_2$ rotate about their centres $M_1$ and $M_2$ in a direction and at a peripheral speed which are equal at point B to those of the pitch circles $K_1$ and $K_2$. All four circles $K_1$, $K_2$, $E_1$, $E_2$, thus roll over one another without slip at point B and the arrows shown indicate the directions of rotation thereof. It is further assumed that the generator curve $F_1$ at the point $P_1$ is anchored fast to the periphery $E_1$ of the first generator circle and the generator curve $F_2$ is anchored fast to the periphery $E_2$ of the second generator circle at the point $P_2$, so that the generator curves $F_1$ and $F_2$ participate in the above-mentioned rotation of the generator circles $E_1$ and $E_2$. Finally, the origins $P_1$ and $P_2$ of the generator curves $F_1$ and $F_2$ must also be so disposed on the generator circles $E_1$ and $E_2$ that these origins $P_1$ and $P_2$ meet exactly at point B in rolling with the generator circles $E_1$ and $E_2$. The length of the circular arc from B to $P_2$ must therefore always be equal to the length of the circular arc from B to $P_1$.

Figure 2:
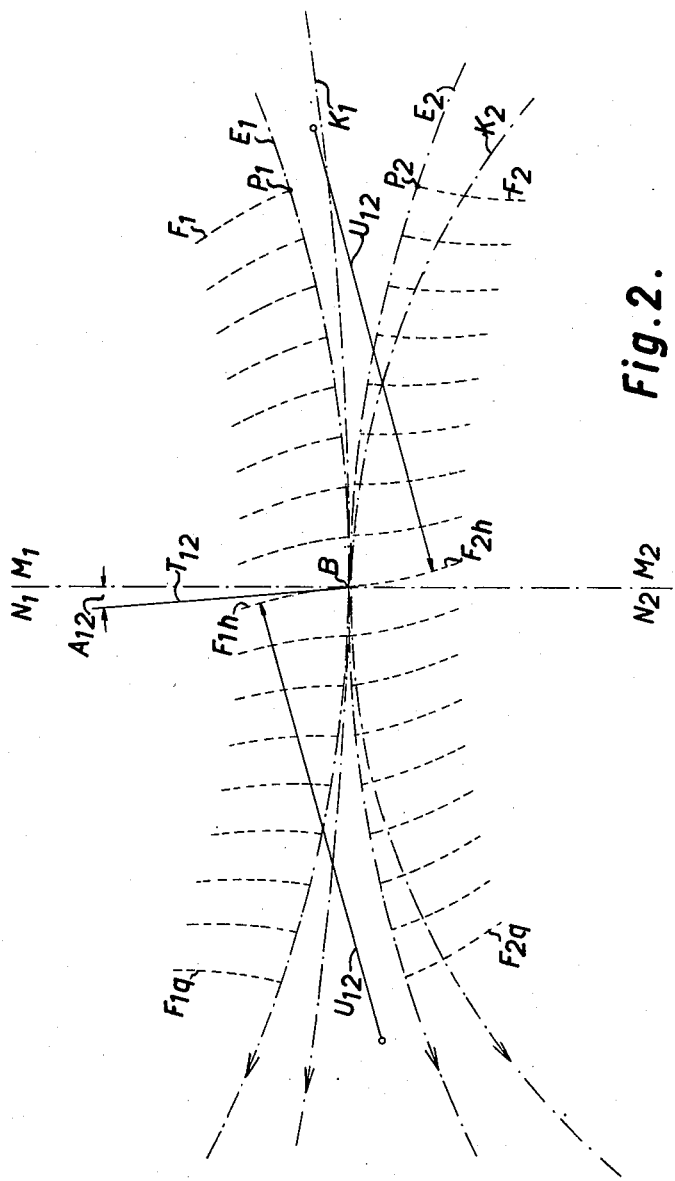
Figure 2 shows a five-fold enlarged representation of the circles in the region of their common point of contact, the movement of the generator curves being illustrated.

Figure 2 illustrates the movements performed by the generator curves $F_1$ and $F_2$ on the rotation of their respective generator circles $E_1$ and $E_2$. Figure 2 shows the region of point B on a scale enlarged five times in relation to Figure 1; the centres $N_1$, $N_2$, $M_1$, $M_2$ of the generator circles $E_1$, $E_2$ and pitch circles $K_1$ and $K_2$ are consequently located outside the figure. In contradistinction to Figure 1, in Figure 2 the pitch circles $K_1$, $K_2$ and the generator circles $E_1$, $E_2$ are shown in chain-dotted lines as they are auxiliary curves. The starting position of the two generator curves $F_1$, $F_2$ is located on the right on the outside. The curves having their origin on the two generator circles $E_1$, $E_2$ and shown in broken lines indicate the successive positions of the generator curves $F_1$, $F_2$ which they assume in respect of time during the rotation of the generator circles $E_1$ and $E_2$. If for example the two generator circles $E_1$ and $E_2$ have been turned to such an extent that the origins $P_1$ and $P_2$ meet at point B, the generator curves $F_1$, $F_2$ have assumed the positions $F_{1h}$, $F_{2h}$. After a further rotation, the generator curves $F_1$, $F_2$ will have the positions shown on the left on the outside and designated by $F_{1q}$ and $F_{2q}$. These different positions on the generator curves $F_1$ and $F_2$ and also the pitch circles $K_1$, $K_2$ and the generator circles $E_1$, $E_2$ are again shown to scale in Figure 3.

If we now first observe the path travelled by the first generator curve $F_1$ by way of $F_{1h}$ to $F_{1q}$ (Figures 2 and 3), it is seen that the generator curve $F_1$ must obviously envelop a curve $G_1$ (Figure 3) on a plane rotating with the pitch circle $K_1$, which curve extends from the periphery of the pitch circle $K_1$ inwards. While the generator curve $F_1$ is turning by way of $F_{1h}$ to $F_{1q}$ about the centre $M_1$ of the first generator circle $E_1$, the curve $G_1$ turns by way of $G_{1h}$ to $G_{1q}$ about the centre $N_1$ of the pitch circle $K_1$. The curve $G_1$ therefore constitutes an envelope and is the flank of a tooth of the wheel having the pitch circle $K_1$. On the other hand, the second generator curve $F_2$ running from $F_2$ by way of $F_{2h}$ to $F_{2q}$ will envelop another curve $H_1$ on the same plane rotating with the pitch circle $K_1$, which curve extends outwards from the pitch circle $K_1$ and moves from $H_1$ by way of $H_{1h}$ to $H_{1q}$. The curve $H_1$ is accordingly the face of a tooth of the wheel having the pitch circle $K_1$. The entire profile of a tooth of the wheel having the pitch circle $K_1$ is thus composed of the flank $G_1$ and the adjoining face $H_1$, as is illustrated in the case of the tooth shown on the right on the outside in Figure 3.

In similar manner the tooth profile $G_2$, $H_2$ of the pinion provided with the pitch circle $K_2$ is obtained as an envelope curve. The flank $G_2$ extending inwards from the pitch circle $K_2$ turns by way of $G_{2h}$ to $G_{2q}$ and it is the envelope curve of the second generator curve $F_2$ moving from $F_2$ by way of $F_{2h}$ to $F_{2q}$, which generator curve rotating with the second generator circle $E_2$. In addition, the face $H_2$ extending outwards from the pitch circle $K_2$ moves by way of $H_{2h}$ to $H_{2q}$ and it is the envelope curve of the first generator curve $F_1$ moved from $F_1$ by way of $F_{1h}$ to $F_{1q}$, and which rotates with the first generator circle $E_1$. The complete tooth profile of the pinion provided with the pitch circle $K_2$ is shown in the position $G_{2q}$, $H_{2q}$, on the tooth illustrated on the outside on the left. Each of the two generator curves $F_1$ and $F_2$ thus generates those faces and flanks of the wheel and pinion which, viewed from point B, are located on the side of the corresponding generator curve.

The tooth profiles $G_1$, $H_1$ of the wheel and the tooth profile $G_2$, $H_2$ of the pinion according to Figure 3 are shown again in Figure 4, the intermediate positions being omitted. In Figure 4 consecutive teeth of the wheel and pinion are also shown and 72 teeth are assumed for the wheel furnished with the pitch circle $K_1$ and 16 teeth for the pinion furnished with the pitch circle $K_2$. Viewing radially outwards from the centres $N_1$ and $N_2$ of the pitch circles $K_1$ and $K_2$, it is seen that the tooth profiles $G_1$, $H_1$ and $G_2$, $H_2$ are both right-hand profiles, which roll over one another on the rotation of the wheel and pinion. The corresponding left-hand profiles $G'_1$, $H'_1$, G'₂, H'₂ of the teeth (Figure 4) can be obtained direct in the customary manner by simple mirror-inversion of the right-hand profiles G₁, H₁ and G₂, H₂ of the teeth. It is however also possible to obtain the left-hand profiles G'₁, H'₁ and G'₂, H'₂ direct as envelope curves, if the generator curve F₁ in Figure 1 is mirrored on the radius R₁ of the generator circle E₁ and likewise the generator curve F₂ on the radius R₂ of the generator circle E₂.

Figure 3:
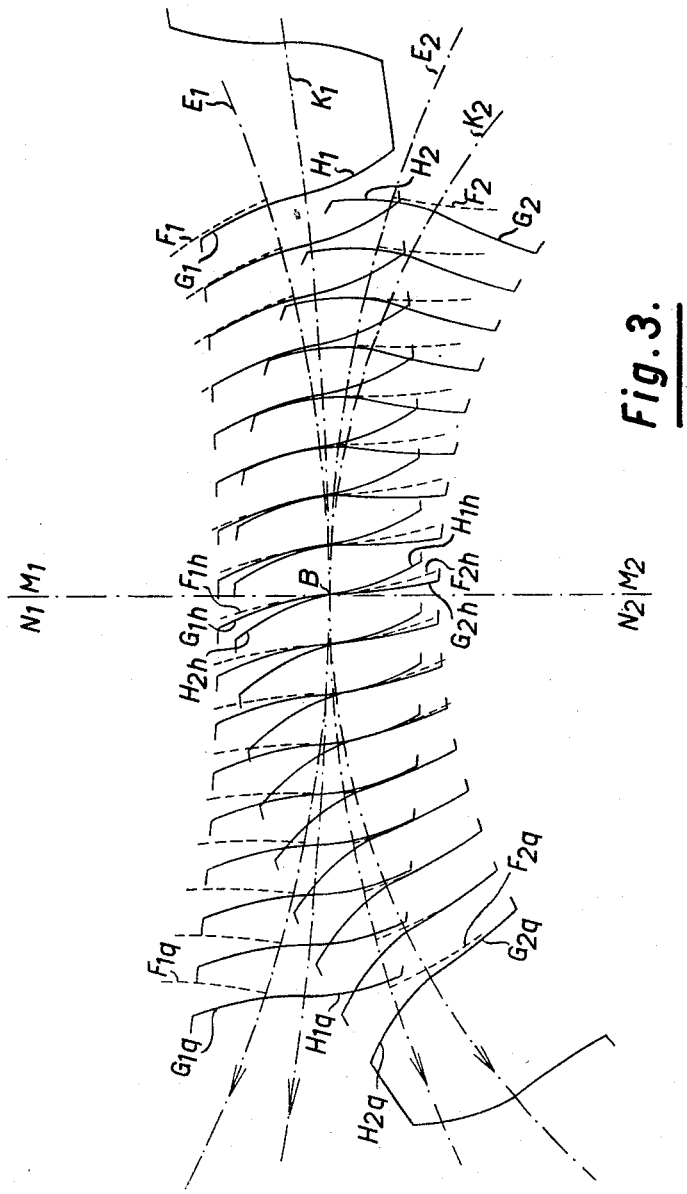
Figure 3 is a repetition of the representation of Figure 2 on the same scale, while however the faces and flanks, produced as envelope curves, of the wheel and pinion are introduced.

Depending on the selected values of the initial magnitudes, the most diverse tooth profiles can be obtained. If for example it is presupposed that the tooth profiles G₁, H₁ and G₂, H₂ are to constitute smooth curves and have no corners at the location of the pitch circles K₁ and K₂, then the angle A₁ must be taken as equal to A₂ (Figure 1). In other words, the two generator curves F₁ and F₂ must form equal angles with the peripheries of their generator circles E₁ and E₂ at their origins P₁ and P₂. This condition is already fulfilled in Figures 1 to 4, as is shown by the continuous merging of the flank G₁ into the face H₁ and the continuous merging of the flank G₂ into the face H₂ (Figures 3 and 4). If therefore A₁ is equal to A₂ and if the origins P₁ and P₂ are moved to point B, the tangents T₁ and T₂ obviously coincide at point B. In Figure 2 the generator curves F₁ₕ and F₂ₕ thus have at point B the common tangent T₁₂, which in relation to the broken connecting line between the centres N₁ and N₂ forms the angle $A_{12}=A_1=A_2$. The angle A₁₂ is the angle which is usually designated the angle of mesh of the toothing.

A special class of gear teeth can also be obtained if the two generator curves F₁ and F₂, including the position of their origins P₁ and P₂, are identical with one another. For example the two generator curves F₁ and F₂ could both be straight lines. In Figures 1 to 4, circular arcs which are identical to one another have been assumed as generator curves F₁ and F₂. The circular arcs accordingly have radii U₁₂ (Figure 2) of the same magnitude.

If it is required that of a large number of wheels having a different number of teeth each wheel should be capable of meshing with each other wheel in the same manner, or in other words that these wheels should all be wheels of a set, the angles A₁ and A₂ (Figure 1) must be equal, the radii R₁ and R₂ of the generator circles E₁ and E₂ must be made equal, and identical generator curves F₁ and F₂ must be used. In set wheels of this type, all wheels with various numbers of teeth can be made with one and the same generating milling cutter.

If furthermore the radius S₁ of the pitch circle K₁ (Figures 1 to 4) is made infinitely great and thus the pitch circle K₁ becomes a straight line, we obtain as envelope curve of the moved generator curves F₁ and F₂ the tooth profile G₁, H₁ of a worm, a rack, or a generating milling cutter. With this last-mentioned generating milling cutter, wheels of any number of teeth can then be cut, the tooth profiles G₂, H₂ of which are determined by the same generator circles and generator curves as those used for the generating milling cutter.

Independently of the numerical values of the initial magnitudes (generator circles, generator curves, angles A₁ and A₂) all gear teeth according to the invention have in common the property, known per se, of being pure rolling teeth. These rolling teeth having moreover a constant transmission ratio between wheel and pinion, i. e. one which does not change periodically. Since there is great freedom in the choice of the numerical values of the initial magnitudes, gear teeth having the above-indicated general properties can also easily be adapted to additional requirements, which may be entailed either by a special purpose or by the method of manufacture of the teeth. This and other modifications which may occur to those familiar with the art fall within the spirit and scope of the invention as set forth in the following claims.

I claim:

1. Gear teeth for a toothed gear having two pitch circles which are in contact with one another, having two generator circles the centres of which are lying on the line connecting the centres of said pitch circles, the generator circles lying eccentrically to one another and being likewise in contact at the point of contact of said pitch circles and rotating in the same direction and at the same peripheral speed at said point of contact as said pitch circles; and having two generator curves each of which being connected with one of said generator circles and extending inwardly from the periphery of the respective generator circle with a curve differing from the radial and rotating together with the periphery of said respective generator circle so that the two peripheral points of said generator curves meet on their rotation at said common point of contact of all four circles; said generator curves on their movement with the generator circles generating envelope curves in relation to said rotating pitch circles which envelope curves are corresponding faces and flanks of the gear teeth, said faces and flanks appertaining to one another in pairs, while each generator curve generates those faces and flanks which are located on their side, viewed from the common point of contact of all four circles.

2. Gear teeth for a toothed gear having two pitch circles which are in contact with one another, having two generator circles the centres of which are lying on the line connecting the centres of said pitch circles, the generator circles lying eccentrically to one another and being likewise in contact at said point of contact of the pitch circles and rotating in the same direction and at the same peripheral speed at said point of contact as said pitch circles; and having two generator curves each of which being connected with one of said generator circles and extending inwardly from the periphery of the respective generator circle with a curve differing from the radial, both generator curves at their peripheral points enclosing equal angles with the radii of said generator circles drawn from said peripheral points, said two angles counted in the same direction, starting from said radii, said generator curves rotating together with the periphery of said respective generator circle so that the two peripheral points of said generator curves meet on their rotation at said common point of contact of all four circles; said generator curves on their movement with the generator circles generating envelope curves in relation to said rotating pitch circles which envelope curves are corresponding faces and flanks of the gear teeth, said faces and flanks appertaining to one another in pairs, while each generator curve generates those faces and flanks which are located on their side, viewed from the common point of contact of all four circles.

3. Gear teeth for a toothed gear having two pitch circles which are in contact with one another, having two generator circles the centres of which are lying on the line connecting the centres of said pitch circles, the generator circles lying eccentrically to one another and being likewise in contact at the point of contact of said pitch circles and rotating in the same direction and at the same peripheral speed at said point of contact as said pitch circles; and having two generator curves each of which being connected with one of said generator circles and extending inwardly from the peripheries of their respective generator circles with a curve differing from the radial drawn from the peripheral point of said generator curves, said two generator curves being identical in their curve path, including the position of said peripheral point and rotating together with the peripheries of their respective generator circles so that said two peripheral points of the generator curves meet on their rotation at said common point of contact of all four circles; said identical generator curves on their movement with the generator circles generating envelope curves in relation to said rotating pitch circles which envelope curves are corresponding faces and flanks of the gear teeth, said faces and flanks appertaining to one another in pairs, while each generator curve generates those faces and flanks which are located on their side, viewed from the common point of contact of all four circles.

4. Gear teeth for a toothed gear having two pitch circles which are in contact with one another, having two generator circles of equal size the centres of which are lying on the line connecting the centres of said pitch circles, the generator circles lying eccentrically to one another and being likewise in contact at said point of contact of the pitch circles and rotating in the same direction and at the same peripheral speed at said point of contact as said pitch circles; and having two generator curves each of which being connected with one of said generator circles and extending inwardly from the periphery of the respective generator circle with a curve differing from the radial, both generator curves at their peripheral points enclosing equal angles with the radii of said generator circles drawn from said peripheral points, said two angles counted in the same direction, starting from said radii, and both generator curves being identical in their curve path including the positions of said peripheral points, said identical generator curves rotating together with the peripheries of their respective generator circles so that the two peripheral points of the generator curves meet on their rotation at said common point of all four circles; said generator curves on their movement with the generator circles generating envelope curves in relation to said rotating pitch circles which envelope curves are corresponding faces and flanks of the gear teeth, said faces and flanks appertaining to one another in pairs, while each generator curve generates those faces and flanks which are located on their side, viewed from said common point of contact of all four circles.

ULRICH GÜNTHER.

No references cited.